Dec. 23, 1924.
R. R. PÖTHIG
1,520,438
CALCULATING MACHINE
Filed July 27, 1922
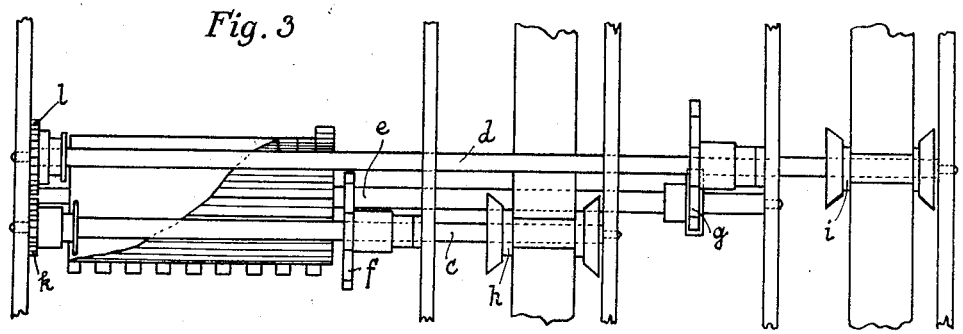
Fig. 3
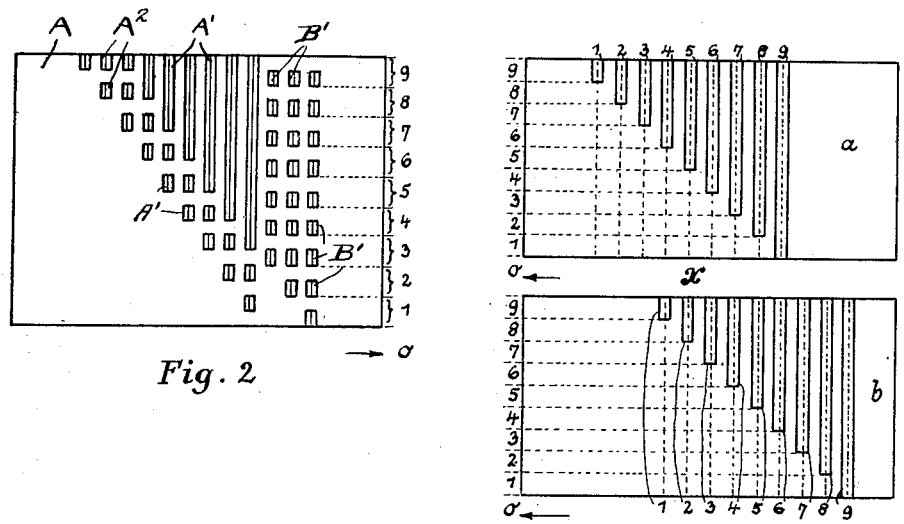
Fig. 2
Fig. 1
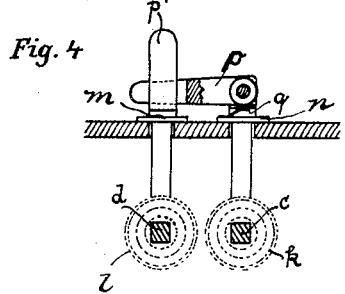
Fig. 4
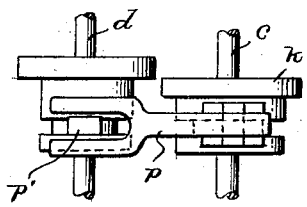
Fig. 4.ª
Inventor:
Reinhold Robert Pöthig
By
Max V. Ordmann
Atty Patented Dec. 23, 1924.

1,520,438

UNITED STATES PATENT OFFICE.

REINHOLD ROBERT PÖTHIG, OF GLASHUTTE, GERMANY.

CALCULATING MACHINE.

Application filed July 27, 1922. Serial No. 578,014.

*To all whom it may concern:*

Be it known that I, REINHOLD ROBERT PÖTHIG, residing at Glashutte, in the Republic of Saxony, Germany, have invented certain new and useful Improvements in Calculating Machines, of which the following is a specification.

Calculating machines according to system Thomas with two counting devices and two drums having graduated teeth are already known (see German Patent No. 210,660). In the said machine the two drums are placed at a considerable axial distance so as to accommodate the gears for operating the machine. As a result a somewhat bulky construction is obtained.

The object of the present invention is to so improve the construction as to render it possible to build the machine of a comparatively small width and enable, without materially increasing the size of the machine, to use a second set of toothed drums and counting device on the opposite side of the driving shaft, which will result in a symmetrical quadruple machine, the driving shaft of which is located in the center thereof.

To accomplish this object the toothed drums are either placed in close proximity to one another, or two sets of graduated teeth are arranged upon a single drum of a length not much greater than the length of an ordinary drum. This enables the arrangement of separate shafts for the transmission gears side by side for each graduated drum system, or counting device and by displacing the graduated teeth of each drum relative to those of the other according to the distance between the centers of said two shafts, space is afforded for the two transmission gears so that all drums, during the rotation of the crank will carry out their operation in due time. Such construction is very practicable. By coupling together the two transmission gears belonging to one position, both counting devices can be operated together with the same adjustment, or when uncoupled said devices can be operable with separate adjustments. Furthermore, there is the advantage that owing to the provision of separate transmission shafts the catch devices or automatically acting couplings for controlling the feeding of the tens which are required when a signal transmission shaft is used, can be entirely dispensed with.

My invention will be more fully understood by reference to the accompanying drawing in which only so much is shown as is actually necessary to understand the invention, and in which, Fig. 1 shows the evolution of two drums with graduated teeth placed axially one behind the other and in which the graduated teeth of the two drums are displaced relative to one another; Fig. 2 shows an evolution of a single drum with two sets of graduated teeth in which the sets are displaced relative to one another; Fig. 3 is a plan view of the machine provided with drums constructed as per Fig. 2 and showing the transmission gears for one position; Fig. 4 is a cross section thru the carriage, the two transmission shafts, the two gears belonging to the same position, and their coupling device, and Fig. 4ª is a top plan view of the coupling device.

Referring to Fig. 1, each drum $a$ and $b$ (shown in evolved state) is provided with the usual set of graduated teeth marked by the numbers 1 to 9 appearing above the drum $a$ and below the drum $b$. The horizontal dotted lines appearing on the drums denote the paths of the individual teeth during the rotation of the drums, $a$, $b$, which paths are numbered correspondingly by the numerals 1 to 9 appearing at the left hand sides of the drums $a$, $b$. These drums, the total length of both of which is naturally larger than that of an ordinary drum, altho the width of the graduations is somewhat smaller than usually, permit the building of a machine, the total breadth of which can be made considerably smaller than that required for the machine made in accordance with the German Patent No. 210,660. The two drums are separated by a space $x$ which serves for the zero position of the shifting gear for one of the drums. This space may be eliminated by the employment of a single drum on which two sets of graduations are arranged, as per Fig. 2. As will be seen, the graduations $A'$, $B'$ on the drum A are displaced relative to one another a distance conforming with that provided between the centres of the transmitting shafts of the gears, which distance, in the example shown, is equal to three units. The construction according to Fig. 2 is preferred. Here the single drum A is provided with two sets of graduated teeth $A'$, $B'$. These sets of graduated teeth are interfitted and so displaced that the first, third, fifth, etc., row of one set serves for one of the transmission gears and the second, fourth, sixth, etc., row of the second set B' serves for the second transmission gear. In this arrangement, the teeth of each group describe the paths indicated by dotted lines in Fig. 2, which paths are correspondingly marked with the numbers 1 to 9 appearing on the right of the drum A in Fig. 2. It will be noted that the parts $A^2$ of the graduated teeth A' are broken on lines coinciding with the teeth of the second set B', so that both gears may be operated simultaneously. It will also be noted that while one gear co-operates with the set A' and the broken parts $A^2$ of said teeth, the other gear will co-operate partly with the set B' and partly with the set A'. Thus a single drum with the two sets of graduated teeth can be employed for the two displaceable transmission gears of the counting device.

In Fig. 3, $c$ and $d$ denote the shafts of the displaceable transmission gears $k$ and $l$ and are shown arranged at a distance from one another which conforms with the displacement of the two sets of graduated teeth A' and B'. The spindle $e$ bearing the toothed drum A and adapted to be coupled to the driving shaft is long enough to operate also the tens of the remote counting device (not shown). $f$ and $g$ denote the well known locking discs, which in cooperation with means (not shown) serve to lock the drum against rotation, after the transmission gear has been shifted out of engagement therewith and $h$ and $i$ the movable sleeves each carrying two bevel wheels which form part of the well known reversing gears for addition and subtraction.

Owing to the distance between the two transmission shafts $c$, $d$, each of the two gears $k$ and $l$ can be separately adjusted so that each of the two counting devices can be operated separately with different adjustment of the gears. But in Figure 4 a simple device is shown whereby it is possible to couple both gears or their slides $m$ and $n$. This is accomplished by handles $p$ and $p'$ projecting from the hubs or sleeves of the gears, of which $p$ is formed with a recess or slot to engage the handle $p'$. Although both gears are displaced axially one step, as required by the construction according to Figure 2, the handles $p$ and $p'$ are in line and on tilting over the handle $p$ its recessed part will engage the handle $p'$ (see Fig. 4). The proper operation of the handle $p$ in either of the two positions is insured by a spring $q$ beneath an angular edge of the handle $p$. The coupling can, of course, be effected by other means.

What I claim is:—

1. In a counting machine of the character described a single drum having two sets of graduated teeth thereon displaced relative to one another, two parallel shafts and a transmission gear on each of said shafts adapted to cooperate with said teeth and spaced apart a distance conforming with the displacement of said sets of teeth.

2. In a counting device of the character described a single drum having two sets of graduated teeth thereon displaced relative to one another, two parallel shafts, a slidable transmission gear on each of said shafts adapted to cooperate with the said sets of teeth and spaced apart a distance conforming with the displacement of said sets of teeth and coupling means between said two gears.

3. In a counting device of the character described a single drum having two sets of graduated teeth thereon displaced relative to one another, two parallel shafts, a slidable transmission gear on each of said shafts adapted to cooperate with said sets of teeth and spaced apart a distance conforming with the displacement of said sets of teeth and coupling means between said two gears, said coupling means including a tiltable member.

In testimony whereof I affix my signature in presence of two witnesses.

REINHOLD ROBERT PÖTHIG.

Witnesses:
Dr. A. KLEBER,
ALFRED D. HEUBURG.